United States Patent [19]
Kiselev

[11] Patent Number: 4,838,906
[45] Date of Patent: Jun. 13, 1989

[54] CONTACT-AND-SEPARATING ELEMENT

[75] Inventor: Viktor M. Kiselev, Kharkov, U.S.S.R.

[73] Assignee: Ukrainsky-Nauchno-Issledovatelsky Institut Prirodnykh Gazov "Ukrniigaz", Kharkov, U.S.S.R.

[21] Appl. No.: 235,684
[22] PCT Filed: Sep. 16, 1986
[86] PCT No.: PCT/SU86/00085
  § 371 Date: May 11, 1988
  § 102(e) Date: May 11, 1988
[87] PCT Pub. No.: WO88/01894
  PCT Pub. Date: Mar. 24, 1988
[51] Int. Cl.⁴ .............................................. B01F 3/04
[52] U.S. Cl. ...................................... 55/238; 261/79.2
[58] Field of Search ................... 261/79.2; 55/237, 238

[56] References Cited
U.S. PATENT DOCUMENTS
3,296,774 1/1967 Hoogendoorn et al. .......... 261/79.2
3,605,388 9/1971 Zuiderweg et al. ............... 261/79.2

FOREIGN PATENT DOCUMENTS
330875 5/1972 U.S.S.R.
475160 6/1975 U.S.S.R. ............................ 261/79.2

Primary Examiner—Tim Miles
Attorney, Agent, or Firm—Fleit, Jacobson, Cohn & Price

[57] ABSTRACT

A contact-and-separating element of a vortex tray of liquid-gas mass-transfer apparatus comprises a nozzle (1). At least one annular row of holes (2) is provided at the inlet end of the nozzle. Accommodated inside the nozzle (1) is an axial swirler (3) having at least two inclined vanes (5). A separator (9) is provided at the outlet end of the nozzle (1). Located in front of each inclined vane (15) of the swirler (3) on the side of the nozzle inlet end is an additional rib (6) arranged straightwise along the nozzle (1) axis. In addition, there is provided at least one intermediate rib (7) interposed between each pair of the straight ribs (6). The annular row of holes (2) is located in the zone where the straight and intermediate ribs (6,7) are situated.

6 Claims, 3 Drawing Sheets

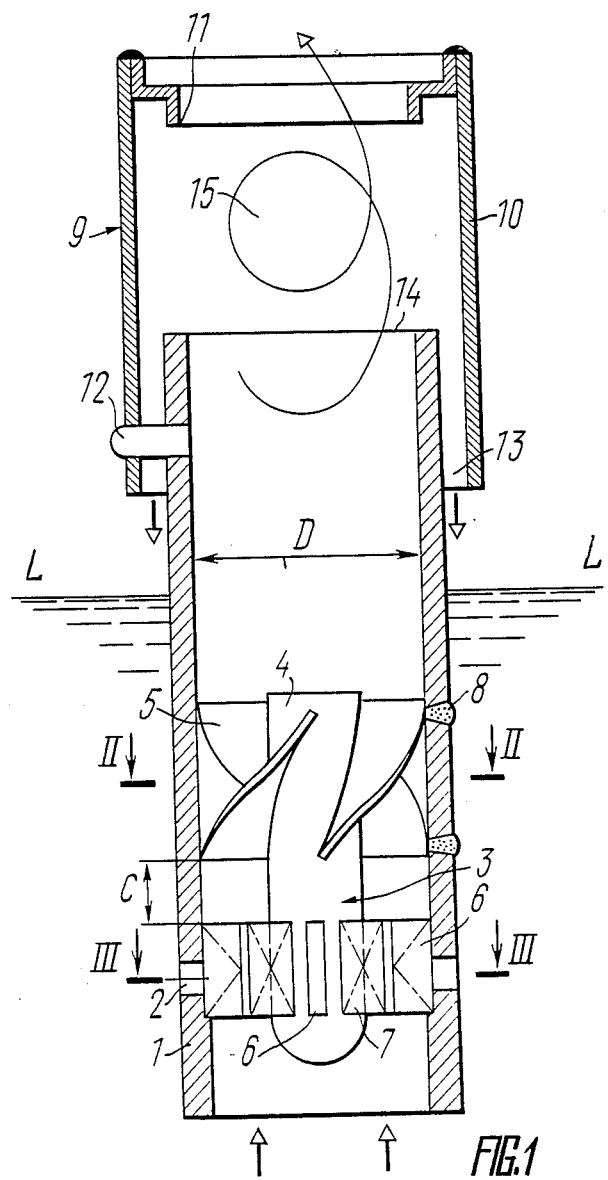

CONTACT-AND-SEPARATING ELEMENT

FIELD OF THE INVENTION

The invention relates generally to chemical engineering industry, more specifically to mass-transfer techniques and has particular reference to contact-and-separating elements.

Present-day heat-and-mass transfer practice is faced with the problem of increasing the productivity, reducing specific metal content, enhancing the reliability and efficiency of the heat-and-mass transfer and phase separation processes. Since mass-transfer columns and liquid-gas separators prove to be the principal apparatus in the gas preparation and processing practice, solution of the aforestated problem will pave the way for development of spacesaving small-size arrangements of the miniature gas-processing plant type, adapted for use in petroleum-and-gas fields in outer continental shelf and in arctic regions, where low weight, small size and high specific output are at a premium nowdays.

Prior Art

Known in the present state of the art is a vortex contact element (c.f. USSR Inventor's Certificate No. 330,875, Int.Cl. BOId 3/30) making use of the swirling flow principle as the basic concept of its operation. The element comprises a vertical shell accommodating short cylindrical nozzles provided with axial swirlers at the inlet end and with hollow centrifugal separators at the outlet end. Central overflow pipes are provided for the liquid to take in and out. A principal working member in the known contact element is a stationary fixed multivane axial swirler which imparts rotation to the gas flow passing therethrough. To provide for adequately intense mass-transfer, use is made in such contact elements of complicated swirlers having hollow perforated vanes.

However, such a contact element places restriction upon the diameter of the apparatus in the case of a multipleelement tray, since an increased number of contact elements upsets their uniform and regular operation, whereby intensity of mass-transfer is affected.

Known in the art is also a contact-and-separating element (cf. USSR Inventor's Certificate No. 475,160, Int.Cl. BOId 3/30), comprising a nozzle perforated in its bottom portion along the entire periphery thereof and provided with a multivane axial swirler at the inlet and a hollow separator at the outlet, both being situated in the zone of nozzle perforations, an annular partition being provided on the outer nozzle wall between the swirler and the separator.

Such a construction arrangement of the contact element is advantageous over that described above in making it possible to considerably enhance technical and economical characteristics of a high-rate multiple-element mass-transfer apparatus.

However, the aforesaid known contact element suffers from the limited mass-transfer intensity and fails to provide efficient separation of fine liquid droplets.

ESSENCE OF THE INVENTION

It is an object of the present invention to provide a contact-and-separating element featuring such a construction arrangement of an axial swirler that would ensure high intensity of the heat and mass transfer processes and separation of finely dispersed drops of liquid from the flow of gas.

The essence of the invention resides in the fact that in a contact-and-separating element of a vortex tray of liquid-gas mass-transfer apparatus, said element comprising a nozzle at whose inlet end there is provided at least one annular row of holes, an axial swirler having at least two inclined vanes and accommodated inside the nozzle, and a separator situated at the outlet nozzle end, according to the invention, a straight rib arranged lengthwise the nozzle axis and facing the nozzle inlet end is provided in front of each inclined vane of the axial swirler, and at least one intermediate rib is interposed between each pair of the straight ribs, while the annular row of holes is situated within the zone where the straight and intermediate ribs are located.

Such a construction arrangement of the contact-and-separating element provides for considerable intensification of the heat-and-mass transfer processes proceeding in liquid-gas systems, this being due to an increased contact surface of the phases by virtue of a preliminary spraying of the liquid phase in a dense straight-line grate formed by the ribs located in front of the inclined vanes of the axial swirler, as well as owing to liquid drops impinging obliquely upon the swirler inclined vanes.

In addition, such a construction arrangement of the contact-and-separating element, according to the invention, provides for hydrodynamic coagulation of fine drops, occurring in the course of separation, in the fluid-swept portion of the axial swirler due to recirculation spraying of the original stock with the caught liquid.

It is expedient that the straight ribs be tightly adjacent, with their side edge, to the inclined vanes and that the edge of the intermediate ribs facing towards the inclined vanes be offset, with respect to the edges of the straight ribs adjacent to the inclined vanes, towards the inlet end of the axial swirler by at least the value of the thickness of an intermediate rib.

Such a constructional feature makes it possible to reduce the size of the contact-and-separating element as for height and allows for uniform flow of gas between the vanes accompanied by additional flow turbulization past the intermediate ribs, which in turn intensifies the heat-and-mass transfer process.

It is also expedient that the straight ribs be tightly adjacent, with their side edge, to the inclined vanes and that the edge of the intermediate ribs facing towards the inclined vanes be provided with a bevel that makes up an acute angle with the longitudinal axis of the intermediate ribs and is directed towards the direction of slope of the inclined vanes.

Such a construction arrangement provides for uniform gas flow between the vanes and reduces hydraulic loss.

It is likewise expedient that the straight and intermediate ribs be spaced apart from the inclined vanes a distance not in excess of the nozzle diameter.

The aforesaid feature provides for maximum useful contact area of the phases which renders the heat-and-mass transfer process more efficient. However, spacing of the ribs apart from the vanes a distance more than the nozzle diameter is inexpedient as being of no avail as to intensification of the process.

It is desirable that the straight and intermediate ribs should project radially substantially as far as the nozzle inner surface and should have an axial length equal to at least one-fourth the axial length of the inclined vanes and that the straight and intermediate ribs be distributed equidistantly over the nozzle inner surface.

Such a construction arrangement enables one to make better use of the fluid-swept portion of the axial swirler in order to intensify the process, since the smaller the hydraulic radius of the fluid-swept portion of the inlet section of the axial swirler the higher the efficiency of mass-transfer, while a uniform spreading of the ribs over the nozzle inner surface contributes to adequate admission of liquid for contact with gas. This in turn makes it possible to pass a maximum amount of liquid through the contact-and-separating element per unit time, i.e., provides for the maximum permissible rate of liquid flow.

It is expedient that provision be made in the straight and intermediate ribs for radial recesses arranged at the level of the annular row of holes and having a depth at least equal to the diameter of the holes of the annular row and that each of said holes be located opposite to one of the ribs.

Such a constructionn arrangement offers the best conditions for spraying of liquid and provides for the maximum efficiency of the heat-and-mass transfer processes due to additional turbulization of the interacting phases.

SUMMARY OF THE DRAWINGS

In what follows the invention is illustrated by a detailed description of a specific embodiment thereof to be read with reference to the accompanying drawings, wherein:

FIG. 1 is a longitudinal sectional view of a schematic diagram of a contact-and-separating element, according to the invention;

PREFERRED EMBODIMENT OF THE INVENTION

Figure 4:
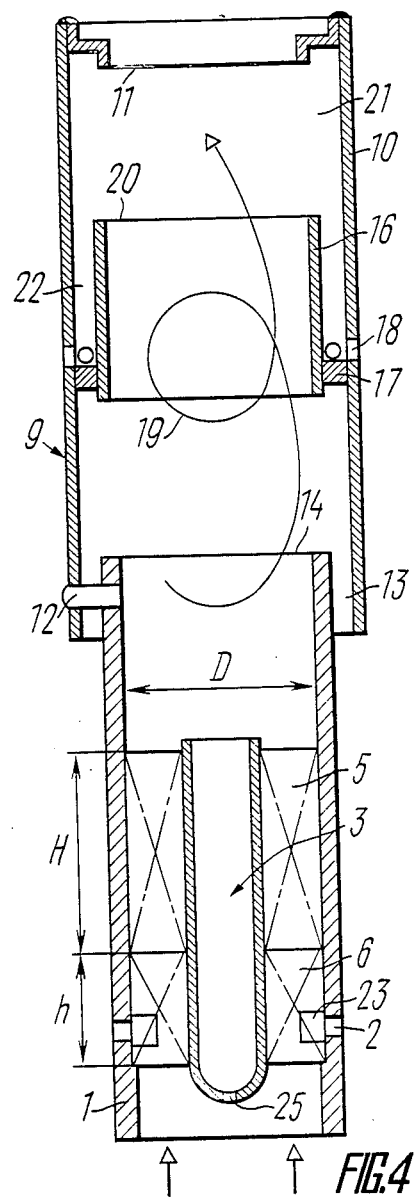
FIG. 4 is a longitudinal sectional view taken through the straight ribs in an alternative embodiment of the contact-and-separating element provided with a double-state separator.

The contact-and-separating element of the invention comprises a stub vertical nozzle 1 (FIG. 1) having an inside diameter D. The inlet end of the nozzle is provided with at least one annular row of holes 2. An axial swirler 3 is accommodated in the nozzle 1, said swirler comprising a central sleeve 4 provided with at least two inclined vanes 5 situated at the outlet end of the swirler. A straight rib 6 arranged lengthwise the axis of the nozzle 1 and facing the nozzle inlet end, is provided in front of each inclined vane 5 of the axial swirler 3. Besides, at least one intermediate rib 7 is situated at the inlet end of the nozzle 1, said intermediate rib being interposed between each pair of the straight ribs 6. The annular row of holes 2 is situated in the zone where the straight ribs 6 and the intermediate ribs 7 are located. The axial swirler 3 is fixed in position in the nozzle 1 by virtue of, e.g., tack welds 8. The straight ribs 6 and the intermediate ribs 7 are spaced a distance C apart from the inclined vanes 5, the distance C being not in excess of the inside diameter D of the nozzle 1. A separator 9 is provided at the outlet end of the nozzle 1, said separator, in its simplest embodiment, comprising a shell 10 arranged coaxially with respect to the nozzle 1 and provided with a diaphragming member 11. The shell 10 is held to the nozzle 1 by means of, e.g., a rod 12 to form an annular passage 13. An outlet end 14 of the nozzle 1, the diaphragming member 11 and the inner wall of the shell 10 establish a separation zone 15.

Figure 2:
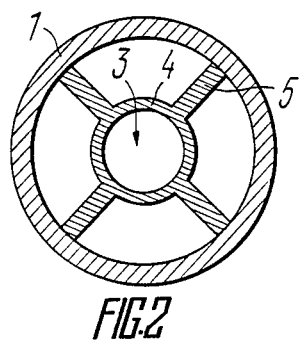
FIG. 2 is a section taken through the inclined vanes of the axial swirler along the line II—II in FIG. 1.

FIG. 2 illustrates a sectional view of the contact-and-separating element taken through the inclined vanes 5 of the axial swirler 3. In this particular embodiment the axial swirler 3 has four inclined vanes 5.

Figure 3:
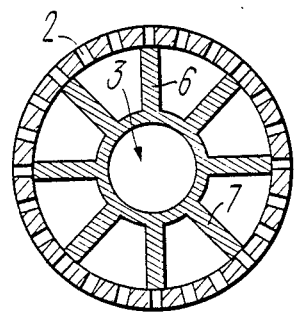
FIG. 3 is a section taken through the straight ribs of the axial swirler along the line III—III in FIG. 1.

FIG. 3 shows a sectional view of the contact-and-separating element taken through the straight ribs 6 and the intermediate ribs 7 of the axial swirler 3. In this particular embodiment the axial swirler 3 has four additional straight ribs 6 and four intermediate ribs 7.

FIG. 4 represents an alternative embodiment of the contact-and-separating element provided with the double-stage separator 9, which has an additional coaxial nozzle 16 interposed between the outlet end 14 and the diaphragming member 11. The nozzle 16 is secured on the shell 10 with the aid of an annular partition 17 above which a number of holes 18 for the liquid to discharge are made in the shell 10. The bottom end 19 of the nozzle 16 and the outlet end 14 of the nozzle 1 establish a first separation zone 15'. A top end 20 of the nozzle 16 and the diaphragming member 11 define a second separation zone 21 having an annular passage 22 for the separated-out liquid to collect. An axial length h of the straight ribs 6 and of the intermediate ribs 7 is equal to at least one-fourth an axial length H of the inclined vanes 5. Radial recesses 23, 24 are made in the straight and intermediate ribs 6 and 7 within the zone of the annular row of holes 2, for a depth at least equal to the diameter of the holes of the annular row, while each of the holes 2 is located opposite to one of the ribs 6 or 7. An outlet hole 25 is provided in the axial swirler 3 for the liquid to discharge.

Figure 5:
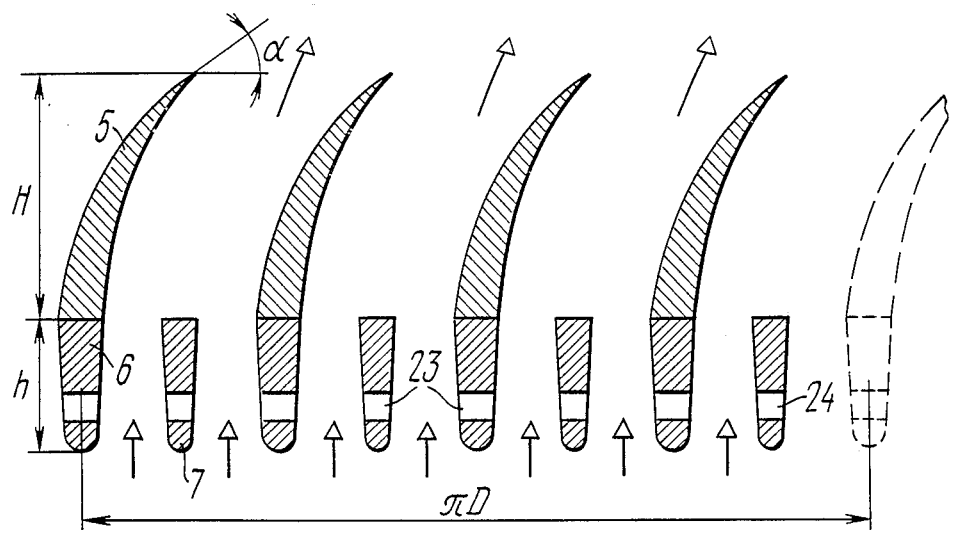
FIG. 5 is a developed view of the vanes and ribs of the axial swirler.

FIG. 5 illustrates a developed view of the vanes 5 and ribs 6, 7 of the axial swirler 3. Adjacent to the inclined vanes 5 are the straight ribs 6 between which are installed the intermediate ribs 7 provided with the radial recesses 24. The exit portion of the inclined vane 5 is arranged at an angle $\alpha$ of from 45° to 75° to the cross-sectional plane of the contact-and-separating element.

Figure 6:
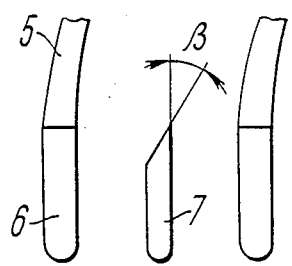
FIG. 6 is a view of an alternative embodiment of the intermediate rib with a bevelled edge.

FIG. 6 illustrates an alternative embodiment of the intermediate rib 7 with a bevelled edge, the top bevelled edge of said rib being cut out at an angle $\beta$ of from 15° to 45°.

Figure 7:
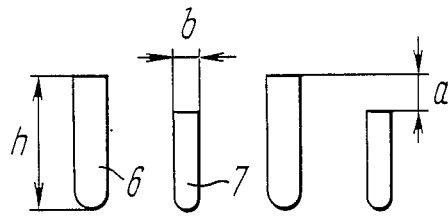
FIG. 7 is a view of an alternative embodiment of the intermediate ribs with their edge offset towards the inlet end of the axial swirler.

FIG. 7 illustrates one more embodiment of the intermediate ribs 7 featuring its edge offset by a value of 'a', which equals from one to three thickness values 'b' of the rib 7.

The contact-separating element of the invention operates as follows. The flow of gas is admitted to the element in an axial direction as shown with arrows in FIG. 1, thus spraying the liquid fed through the annular row of holes 2 to the zone of the ribs 6 and 7. To provide continuous supply of liquid through the annular row of holes 2 the liquid should be at a constant level LL, which is maintained by virtue of the downflow system of a horizontal tray (omitted in the drawings). Liquid drops move along with the gas in an axial direction to get on the inclined vanes 5 of the axial swirler 3. It is past the swirler 3 that the gas-liquid flow acquires rotary motion whereby part of the drops are free to fall upon the inner wall of the nozzle 1 to form a rotating film that moves upwards by virtue of the forces of friction of the gas flow against the surface of the liquid film. It is in the separation zone 15 that final separation of the liquid drops, as well as of the liquid film from the gas occurs. The separated-out gas passes, in a swirling flow, through the diaphragming member 11, which prevents the liquid from passing through, while the separated-out liquid runs down along the annular passage 13 to get upon the liquid layer at the level LL on the horizontal tray.

When separating a liquid-gas mixture, the latter is fed to the axial swirler 3. In such a case there occurs hydrodynamic coagulation of fine droplets by the flow of larger drops formed in the zone of the ribs 6 and 7, this being due to spraying through the annular row of holes 2. A curtain of larger drops in a turbulent flow contributes to deposition of smaller droplets brought in by the gas flow, upon the larger drops to form still more enlarged drops in a way similar to the process proceeding in the Venturi tubes (turbulent Venturi scrubbers).

It is due to spraying of the liquid, wetting of the surface of the ribs 6, 7 and oblique impacts of the liquid drops against the inclined vanes 5 accompanied by concurrent formation of a swirling liquid-gas flow that high intensity of the heat-and-mass transfer processes between the gas and liquid is attained.

However, further increase of the distance C to a value exceeding the diameter D of the nozzle 1 fails to give still higher intensification of the heat-and-mass transfer processes but leads to an enlarged overall length of the contact-and-separating element as a whole.

To attain more perfect separation of the phases the content-and-separating element may be provided with a double-stage separator (FIG. 4). The heat-and-mass transfer processes in such an element occur in the same way as described above, the final separation of the drops of liquid taking place in the second separation zone 21, whereupon the liquid runs down along the annular passage 22 to get on the annular partition 17. Further on the liquid is discharged from the contact-and-separating element through the holes 18 to get upon the layer of the liquid at the level LL. It is due to the provision of the radial receses 23, 24 that the interacting flows of gas and liquid may be additionally turbulized, which contributes to the maximum intensification of heat-and-mass transfer therebetween. The liquid that is carried to the top open end of the axial swirler 3 by the vortex backflows in the course of operation, will be discharged through the outlet hole 25 when the apparatus is shut down.

When the axial swirler 3 is implemented as shown in FIG. 5, the left-hand top (as shown in the drawing) sharp edge of the rib 7 interferes with the gas flow passage, whereby a smaller amount of gas passes on the left of the rib 7 than on the right. This somewhat affects the throughput capacity of the contact-and-separating element.

To provide for uniform passage of the flows of gas and liquid the rib 7 has its edge bevelled as shown in FIG. 6, or offset by a distance 'a'.

Practical implementation of the contact-and-separating element according to the invention enables one to solve the problem of developing a small-sized highly efficient contact-and-separating element which may be enclosed in a separate shell or built in readily into the shells of the now-existing mass-transfer columns and liquid-gas separators with the purpose of enhancing their productivity and efficiency.

INDUSTRIAL APPLICABILITY

The present invention makes it possible to provide highly efficient contact-and-separating element for smallsized high-rate mass-transfer towers and gas-liquid separators, applicable in most diverse industrial branches.

The invention can also be used in the gas-and-oil industry for implementation of the gas preparation and processing procedures including glycol gas drying, cleaning it from harmful admixtures with amines, as well as in absorption, desorption and rectification processes by hydrocarbon systems, for separation of petroleum methanol, amines for gas condensate from the gas flow.

In the chemical industry the invention can find application in the most diverse processes in combination with other contact-and-separating devices for gas-liquid systems, while in the heat power industry the invention is applicable for steam condensation or for separation of water drops from high-pressure steam.

What is claimed is:

1. A contact-and-separating element of a vortex tray of liquid-gas mass-transfer apparatus, comprising a nozzle (1) at whose inlet end there is provided at least one annular row of holes (2), an axial swirler (3) having at least two inclined vanes (5) and accommodated inside the nozzle (1), and a separator (9) situated at the outlet nozzle end, characterized in that a straight rib (6) arranged length-wise the nozzle (1) axis and facing the nozzle inlet end, is provided in front of each inclined vane (5) of the axial swirler (3), and at least one intermediate rib (7) is interposed between each pair of the straight ribs (6), while the annular row of holes (2) is situated within the zone where the straight and intermediate ribs (6,7) are located.

2. A contact-and-separating element as claimed in claim 1, characterized in that the straight ribs (6) are tightly adjacent, with their side edge, to the inclined vanes (5), while the edge of intermediate ribs (7) that faces towards the inclined vanes (5) is offset, with respect to the edges of the straight ribs (6) adjacent to the inclined vanes (5), towards the inlet end of the axial swirler (3) by at least the value of the thickness b of an intermediate rib (7).

3. A contact-and-separating element as claimed in claim 1, characterized in that the straight ribs (6) are tightly adjacent, with their side edge, to the inclined vanes (5), while the edge of the intermediate ribs (7) that faces towards the inclined vanes (5) is provided with a bevel that makes up an acute angle $\beta$ with the longitudinal axis of the intermediate ribs (7) and is directed towards the direction of slope of the inclined vanes (5).

4. A contact-and-separating element as claimed in claim 1, characterized in that the straight and intermediate rib (6,7) are spaced apart from the inclined vanes (5) a distance not in excess of the nozzle diameter.

5. A contact-and-separating element as claimed in any of claim 1, characterized in that the straight and intermediate ribs (6, 7) project radially substantially as far as the nozzle inner surface and have an axial length equal to at least one-fourth the axial length of the inclined vanes (5), while the straight and intermediate ribs (6,7)

are distributed equidistantly over the nozzle inner surface.

6. A contact-and-separating element as claimed in claim 1, characterized in that provision is made in the straight and intermediate ribs (6, 7) for radial recesses (23, 24) arranged at the level of the annular row of holes (2) and having a depth at least equal to the diameter of the holes (2) of the annular row, while each of the holes (2) of the annular row is located opposite to one of the ribs (6,7).

* * * * *